March 31, 1970 E. G. ROBILLARD ET AL 3,503,158
GRINDING MACHINE
Filed Oct. 2, 1967 14 Sheets-Sheet 1

INVENTORS
Edward G. Robillard
Herbert R. Uhtenwoldt
BY
ATTORNEY

INVENTORS
Edward G. Robillard
Herbert R. Uhtenwoldt
BY
Clara S. Blodgett
ATTORNEY March 31, 1970  E. G. ROBILLARD ET AL  3,503,158

GRINDING MACHINE

Filed Oct. 2, 1967  14 Sheets-Sheet 10

INVENTORS
Edward G. Robillard
BY Herbert R. Uhtenwoldt

ATTORNEY

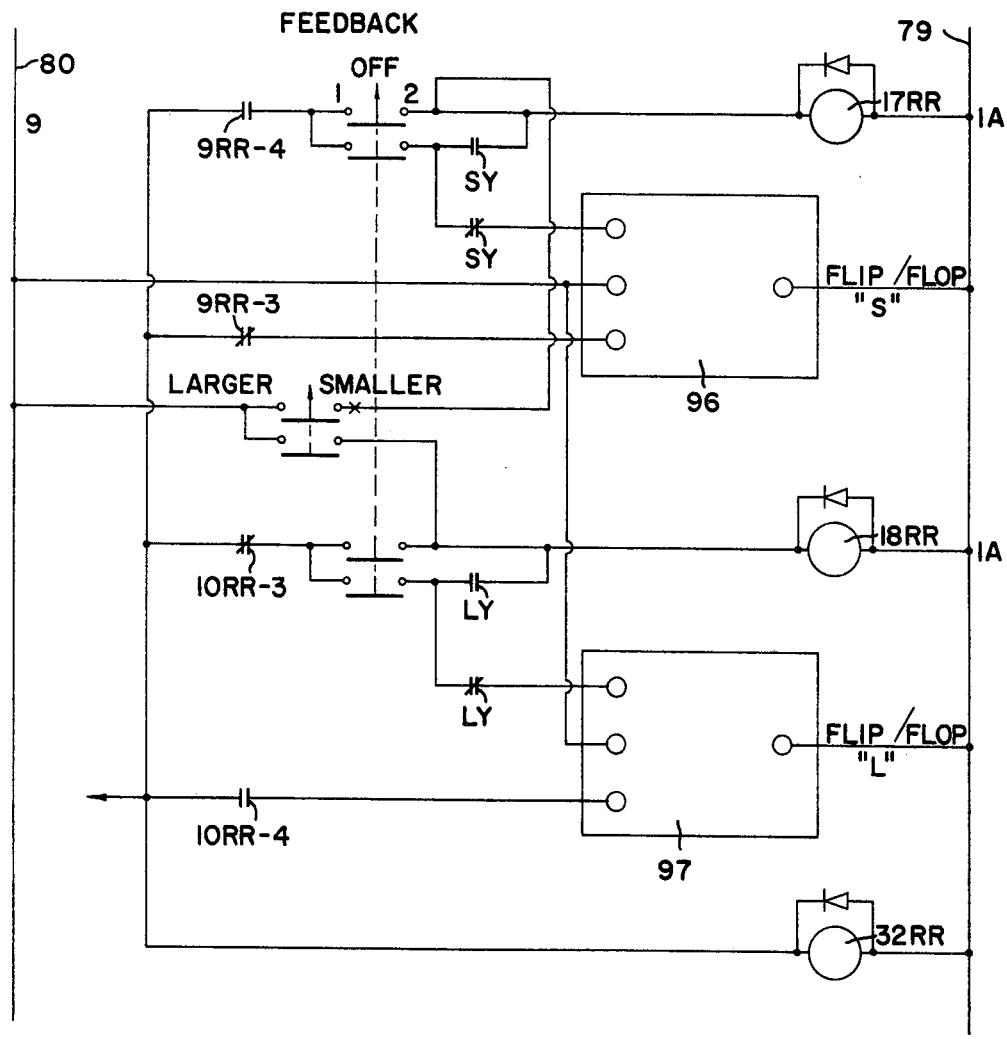
FIG. II

| | | | | | |
|---|---|---|---|---|---|
| 16 | PULSER | 21RR | A ○<br>B ○ | 1 | FLIP/FLOP "A"&"B" — 93, 94 |
| 17 | | | 1 ○<br>2 ○ | 2 | FLIP/FLOP "1"&"2" |
| 18 | | | 4 ○<br>8 ○ | 3 | RELAY/DIODE 40RR 41RR 42RR 43RR |
| 19 | RELAY | 38RR 36RR 14HGR | 10 ○<br>200 | 4 | FLIP/FLOP "4"&"8" |
| 20 | RELAY | 39RR 13HGR | 400<br>800 | 5 | FLIP/FLOP "10"&"20" |
| 21 | MEMORY | 22RR 26RR 23RR 27RR 24RR 28RR 25RR 29RR | S ○<br>L ○ | 6 | RELAY/DIODE 44RR 45RR 46RR 47RR |
| 22 | DUAL CONTACT AMPLIFIER | | | 7 | FLIP/FLOP "40"&"80" |
| 23 | | | | 8 | FLIP/FLOP "L"&"S" — 96, 97 |
| 24 | | | | 9 | DOUBLE RELAY 30RR 31RR 34RR 7RR 37RR 35RR |
| 25 | | | | 10 | |
| 26 | RELAY | 18RR 10RR 3HGR | | 11 | RELAY 17RR 9RR 4HGR |
| 27 | RELAY | 6RR 4RR 1HGR | | 12 | RELAY 3RR 8RR 2HGR |
| 28 | RELAY | 1RR 12RR 12HGR | | 13 | RELAY 11RR 11HGR |
| 29 | RELAY | 19RR 20RR 7HGR | | 14 | RELAY 15RR 16RR 6HGR |
| 30 | RELAY | 32RR 14RR 5HGR | | 15 | RELAY 5RR 13RR 8HGR |

FIG.12

INVENTORS
Edward G. Robillard
Herbert R. Uhtenwoldt
BY
ATTORNEY

United States Patent Office 3,503,158
Patented Mar. 31, 1970

3,503,158
GRINDING MACHINE
Edward G. Robillard and Herbert R. Uhtenwoldt, Worcester, Mass., assignors to The Heald Machine Company, Worcester, Mass., a corporation of Delaware
Filed Oct. 2, 1967, Ser. No. 672,222
Int. Cl. B24b 49/00, 51/00
U.S. Cl. 51—165                                 9 Claims

ABSTRACT OF THE DISCLOSURE

This invention relates to a grinding machine and, more particularly, to apparatus for finishing a surface of revolution by the abrasive grinding process, including a stepping motor for bringing about a cross-feed cycle in accordance with a predetermined pattern.

BACKGROUND OF THE INVENTION

According to one method of the grinding of internal surfaces of revolution, the wheelhead table is advanced during a rough grind by a hydraulic cylinder having fluid presented at a constant pressure. In this way, the wheel is pressed against the workpiece and grinding takes place at a constant predetermined force; this is the so-called "controlled force" method of grinding. Before a dress point is reached and before a change to a fine finish grind, the wheelhead table contacts a stop, which would normally interrupt the advance of the wheel, except for the residual deflection in the spindle. However, in accordance with the procedure shown and described in the patent application of Hatstat et al. Ser. No. 451,552, filed Apr. 28, 1965, the stop is moved or retracted at a fixed rate and the grinding continues according to the "feed rate" method. In those machines in which the point of dress is determined by the wheelhead striking a dress switch at a certain point in the feed traverse movement, the prior art system works adequately. However, when a gage is used to determine the dress point directly from a measurement of the size of the workpiece as the grinding progresses, the use of such a retractable stop leads to certain difficulties. For one thing, the amount of feed required before the dress signal is obtained from the gage will vary because of O.D. and stock variations from one workpiece to another. The rate at which the feed stop retracts is fixed and is selected, of course, to be less than the rate of feed that would take place if the controlled force were still determining the feed. This means that, as the stop is retracted at its fixed rate, it will also be deflected. In other words, the main feed cylinder pushes the wheelhead table against the stop with a constant force even after the "controlled force" part of the cycle is over and the "feed rate" part begins. The deflection of the stop varies with time, however, because part of the force from the feed cylinder is absorbed by the pressure of the abrasive wheel on the workpiece. That is to say, when pure controlled force is used the entire force is used in the grinding force and is entirely absorbed in the pressure between the abrasive wheel and the workpiece, resulting in a fixed deflection of the spindle; when the feed rate is used, part of the force is absorbed in spindle deflection and pressure between wheel and workpiece, while the remainder of the force is felt by the stop. Since the dress signal can be indicated by the gage at any time during the feed rate portion of the grind, the deflection of the feed stop can vary from one workpiece to another. This also means that the retraction must be set for the worst case, which results in a longer grinding cycle time. These and other difficulties experienced with the prior art devices have been obviated in a novel manner by the present invention.

It is, therefore, an outstanding object of the invention to provide a grinding machine for finishing a surface of revolution to a high degree of accuracy.

Another object of the invention is the provision of a grinding machine in which inaccuracies due to switching from controlled force to feed rate grinding are minimized.

A further object of the present invention is the provision of a grinding machine in which variations in pressure on the feed stop at the time of dress is maintained at a constant value from workpiece to workpiece, despite variations in workpiece rough size.

With these and other objects in view, as will be apparent to those skilled in the art, the invention resides in the combination of parts set forth in the specification and covered by the claims appended hereto.

BRIEF DESCRIPTION OF THE DRAWINGS

The character of the invention, however, may be best understood by reference to one of its structural forms, as illustrated by the accompanying drawings, in which:

FIGS. 3 through 12 are electrical diagrams showing in detail the electrical portion of the apparatus.

Generally speaking, the present invention uses a stop which contacts the compensation slide portion of the wheelhead in the usual way and makes electrical as well as mechanical contact, so that the gage becomes operative. Then, instead of the stop being retracted, the compensation slide (and, therefore, the wheelhead) is moved by a stepping motor to the rear of the machine at a preset rate, i.e., .000050" increments in the preferred embodiment. Inmost cases, the rate would be set at a maximum (say, 100 steps per sec. on the stepping motor) and the slide will only step far enough to break electrical contact between the slide and the stop. This occurs rapidly in small increments, so that there is very low force buildup on the stop. The compensation slide acts as a "floating stop." This stop will be synchronized with the wheelhead cross-slide when the dress signal is obtained from the gage. At this time, the stepping motor stops the feed and a circuit is energized to remember the number of pulses of feed required. The cross-slide is reset to "zero" on the start feed position. After the dressing operation has been completed, the compensation slide is retracted and, because the force or pressure of the wheel on the workpiece is always the same at the dress point, the retraction setting does not have to be set for the worst case condition.

The cross-slide will next feed up until the stop re-contacts the compensation slide. When this happens, the compensation slide under the impetus of the stepping motor will retract to the dress size position at the 100 step/second rate, the number of pulses required to do this being retrieved from the memory circuit. When this position (at which the gage had previously indicated that dress should take place) is reached, the fine finish feed takes place by moving the compensation slide rearwardly. Eventually, the gage will indicate the arrival of the workpiece size; this will terminate the fine feed and grinding will continue under sparkout conditions due to the pressure of the deflection in the spindle until the gage indicates that the final size has been reached.

At final size, the compensation slide will be reset to the "zero" or start feed position. A feedback circuit will also be energized to compare the number of pulses required to obtain the final size to a standard number of pulses. If the number of feed pulses is below the "EARLY GAGE" limit, a feedback signal will shift the "FIRST SIZE" point to a smaller point. On the other hand, if it is above the "LATE GAGE" limit, the feedback signal will shift the "FIRST SIZE" point to a larger point. If the number of pulses is between the two limits (NORMAL GAGE), there will be no feedback signal.

Figure 1:
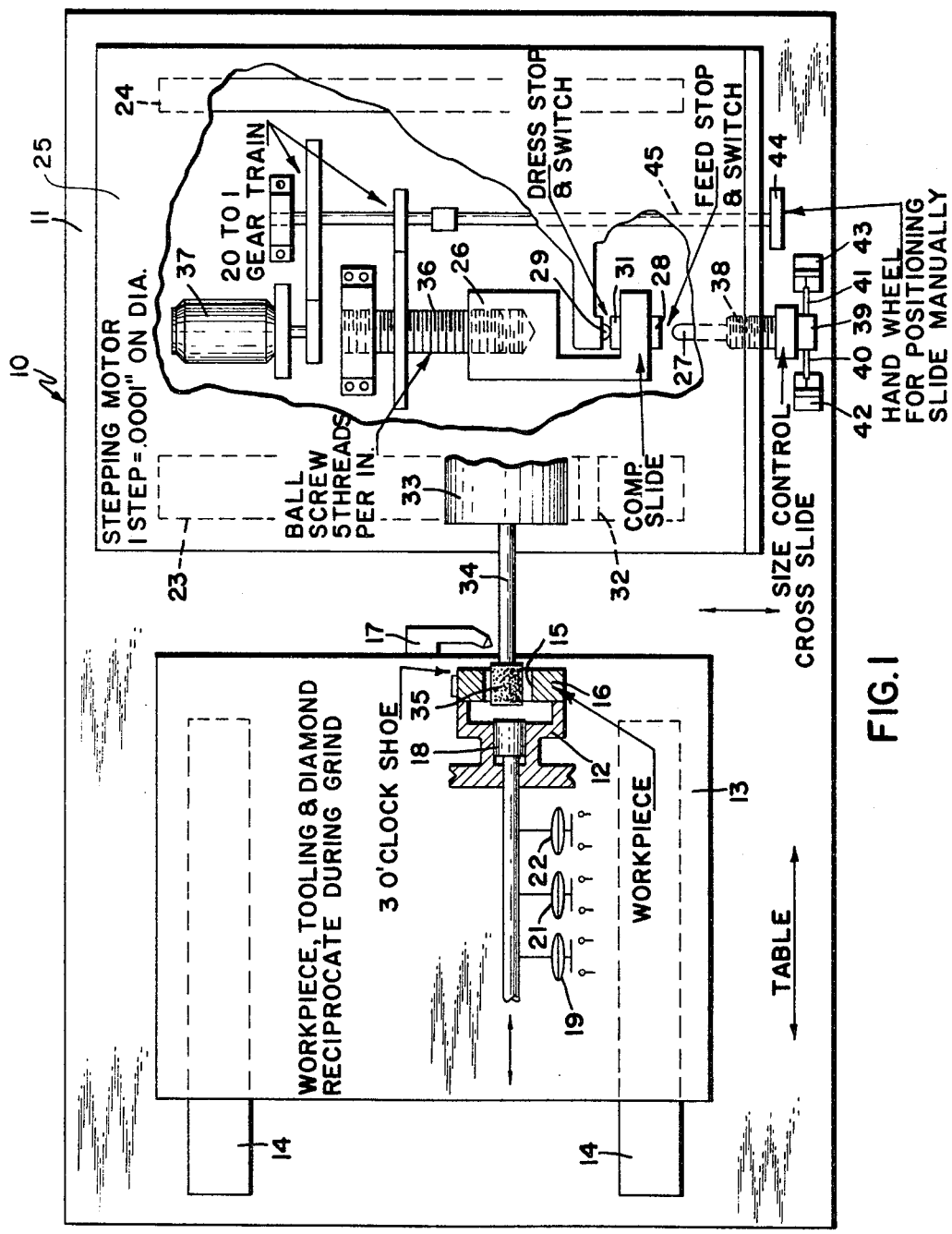
FIG. 1 is a schematic plan view of a grinding machine embodying the principles of the present invention.

Referring first to FIG. 1, wherein are best shown the general features of the invention, the grinding machine, indicated generally by the reference numeral 10, is shown as being of the general type shown and described in the patent of Hohler et al. No. 3,197,921 of Aug. 3, 1965. It consists of a base 11 on which is mounted a workhead 12 carried on a workhead table 13 which is capable of sliding motion on ways 14 extending parallel to the axis of a surface of revolution 15 of a workpiece 16 which is to be finished. Also mounted on the workhead table 13 is a dressing apparatus 17 having a diamond. Extending through the workhead 12 for engagement with the workpiece bore (surface of revolution 15) is a pneumatic gage 18 of the type shown and described in the patent of Schmidt et al., No. 2,771,714, of Nov. 27, 1956. This gage is suitably connected to suitable pressure switches, such as a pressure switch 19, capable of indicating when the size of the bore 15 has reached the size at which it is necessary to dress the wheel, a pressure switch 21 indicating when the bore has reached an intermediate size at which the finish grind is to be terminated, and a pressure switch 22 which is operative when the size of the bore has reached the final size.

Also mounted on the base 11 is a wheelhead table 25 which is slidable on ways 23 and 24 to move transversely of the axis of the surface of revolution 15. Both the table 13 and the table 25 are movable under the impetus of hydraulic linear actuators to produce their respective motions. Lying on the base 11 and slidable over its surface is a compensation slide 26. Extending from the wheelhead table 25 is a finger 27 in line to engage a forwardly-facing feed stop 28 which is mounted on the forward face of the compensation slide. The finger 27 and the feed stop 28 are also arranged as an electrical switch for placing the pneumatic gage 18 in operative condition on occasion.

The wheelhead table 25 is also provided with a downwardly extending finger 29 which is in position to engage a rearwardly-directed dress stop 31 formed on the compensation slide 26. There is a considerably greater distance between this finger 27 and the finger 29 than there is between the feed stop 28 and the dress stop 31, so that the table 25 is capable of a wide range of operative movement between those two portions with motion provided by a suitable hydraulic cylinder 32. This cylinder is arranged with the usual servo valves and so on to produce very quick action in moving the wheelhead table 25 from a first position where the finger 27 engages the feed stop 28 to the second position at which the finger 29 engages the dress stop 31. Mounted on the wheelhead 25 is a wheelhead 33 carrying a rotatable spindle 34, the outer end of which carries an abrasive wheel 35. The cylinder 32 is provided with hydraulic fluid at a carefully regulated pressure so that it is possible to predetermine the force producable by the cylinder and use that force for engagement of the abrasive wheel 35 with the workpiece 16 according to the well-known "controlled-force" grinding principle. The back end of the compensation slide 26 is threadedly engaged with a screw 36 which is driven through suitable gearing by a stepping motor 37. The stepping motor, the screw 36, and the compensation slide 26 operate to give a readily-selected accurate compensation at the time of dress in accordance with the teaching set forth in the patent application of Robillard Ser. No. 482,846, filed Aug. 26, 1965, now Patent No. 3,403,480, dated Oct. 1, 1968.

The finger 27 is engaged with the front of the cross-slide or wheelhead table 25 through a screw 38 to provide a certain degree of adjustment. This adjustment takes place by a ratchet 39 mounted on the front of the screw 38 and operated in opposite directions by pawls 40 and 41 slidable back and forth by cylinders 42 and 43. A handwheel 44 operates through a rod 45 to permit manual operation of the screw 36 to provide for minor adjustments of the compensation slide 26.

Figure 2:
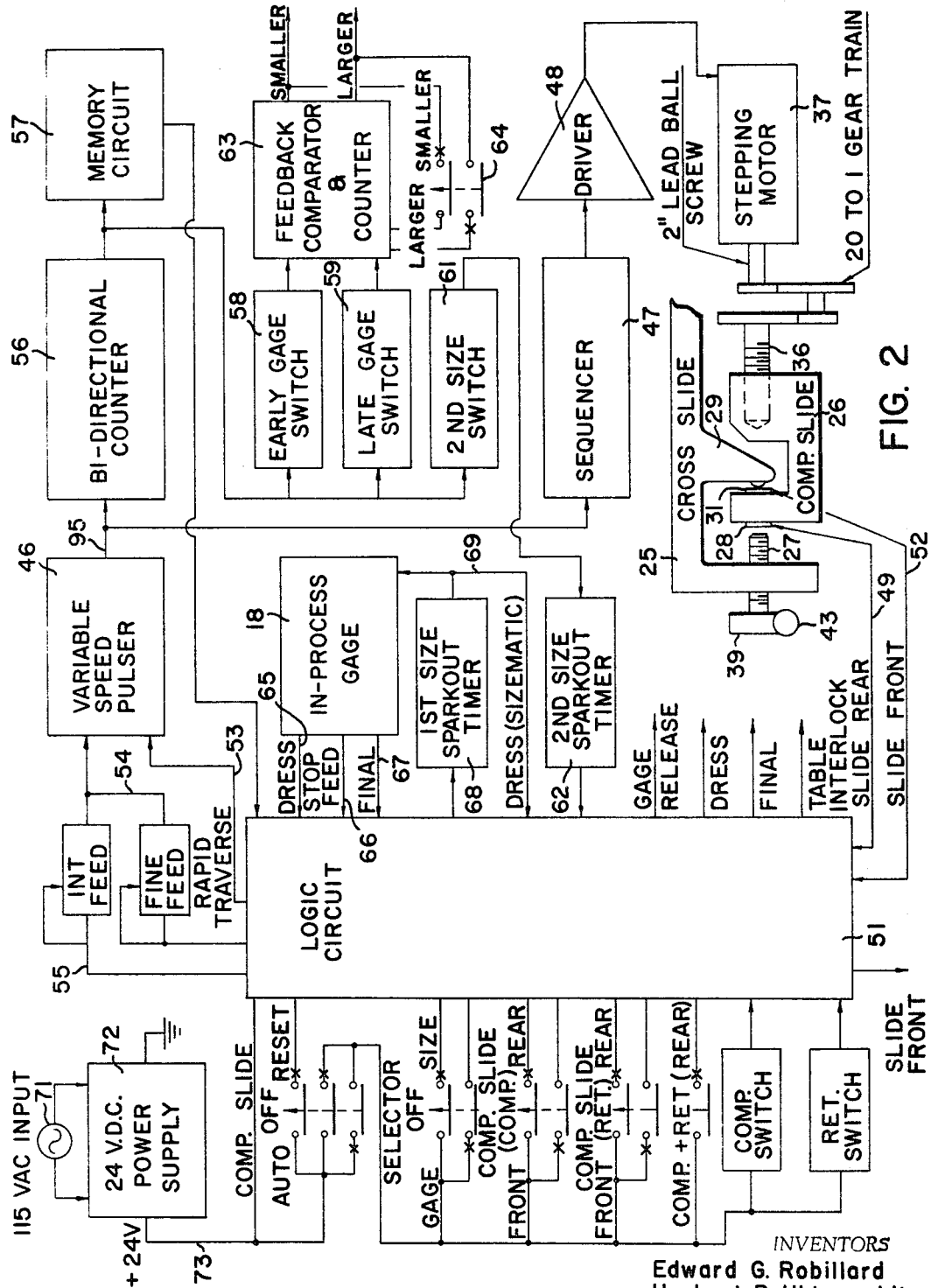
FIG. 2 is a somewhat schematic view of the control apparatus forming part of the machine.

FIG. 2 shows the manner in which the cross-slide or wheelhead table 25 is provided with the finger 27 for engaging the feed stop and switch 28 on the compensation slide 26 and the finger 29 which engages the dress stop 31 facing rearwardly on the compensation slide. The stepping motor 37 is provided with pulses from a variable speed pulser 46 operating through a sequencer 47 and a driver 48. When the finger 27 engages the feed stop 28 an electrical signal is sent through a line 49 to a logic circuit 51. Similarly, when the finger 29 engages the dress stop 31, an electrical signal is sent through a line 52 to the logic circuit. The pulser 46 is regulated for rapid traverse through a line 53 for fine feed through a line 54 and for intermediate feed through a line 55 while extending from the logic circuit 51 to the pulser 46.

A bidirectional counter 56 is connected on one side to the pulser 46 to receive the same signals that the sequencer 47 receives and on the other side to a memory circuit 57. The counter 56 also emits signals through an EARLY GAGE switch 58, a LATE GAGE switch 59, and a SECOND SIZE switch 61. The output of the SECOND SIZE switch is connected to a SECOND SIZE SPARKOUT timer 62 which, in turn, is connected to the logic circuit 51. The EARLY GAGE switch 58 and the LATE GAGE switch 59 have outputs which are connected to a feedback comparator and counter 63 which are connected to a switch 64 for operating the cylinders 42 and 43 to make adjustments in the finger 27. The in-process gage 18 is shown as having lines 65, 66, and 67 for sending signals to the logic circuit which signals are indicative, respectively, of the point when dress size is reached, the point where the beginning of fine grind feed has been reached, and the final size after sparkout. The logic circuit 51 is connected to the in-process gage 18 by a first size sparkout timer 68 for use on occasion and also by a line 69 for use when the dress size is indicated by a stop rather than by the gage 18. A 115 volt A.C. source 71 is connected to a power supply 72 giving a 24-volt D.C. output on a line 73. This line is connected through various switches to the logic circuit 51 in a manner which will be described more fully hereinafter.

Figure 3:
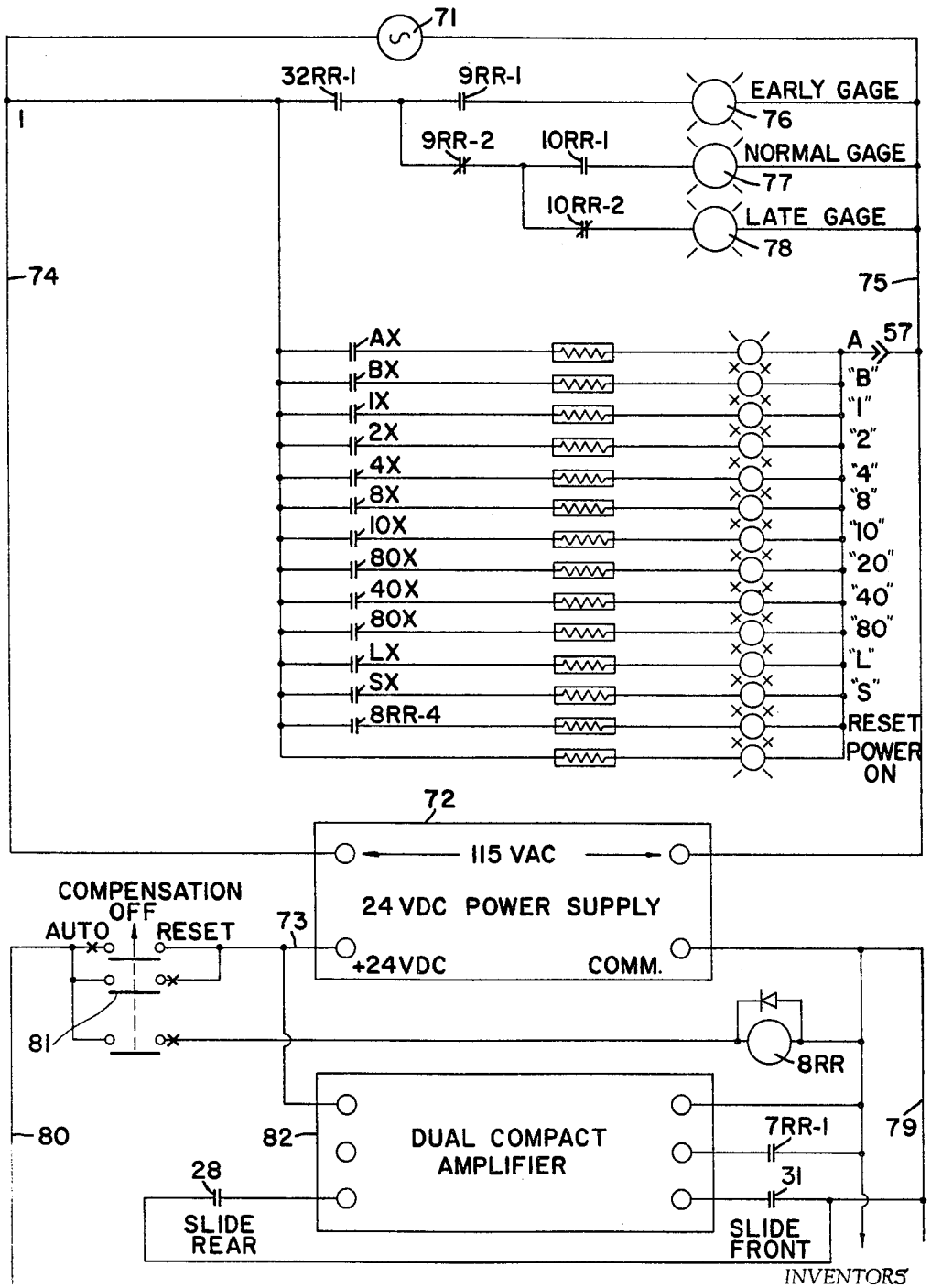

In FIG. 3, it can be seen that the power source 71 is connected to two power lines 74 and 75 across which various indicating lights are connected. For instance, an early gage lamp 76 is connected across the lines by the closure of normally-open contactors 32RR–1 and 9RR–1. The normal gage lamp 77 is rendered operative when in addition to the closure of the normally-open contactor 32RR–1, a normally-closed contactor 9RR–2 remains closed remains closed and a normally-open contactor 10RR–1 is closed. Finally, the late gage lamp 78 is energized when the normally-open contactor 32RR–1 is closed, the normally-closed contactor 9RR–2 remains closed, and the normally-closed contactor 10RR–2 remains closed. Furthermore, a large number of indicating lamps are connected from the lines 74 to the lines 75 by the closure of various normally-open contactors. The power lines 74 and 75 are also connected to the input side of the power supply 72. At one side, the ground side of the power supply is connected to a line 79. At the other side of the line 73 is connected through a compensation switch 81 to the power line 80. The power line 80 is connected through one portion of the compensation switch 81 through the coil of the relay 8RR to the line 79 and a dual contact amplifier 82 is connected from the line 73 to the line 79. The signal input to the amplifier is connected through the slide front and the slide rear switches 28 and 31, respectively. Finally, the amplifier is connected to ground through a normally-open contactor 7RR–1.

Figure 4:
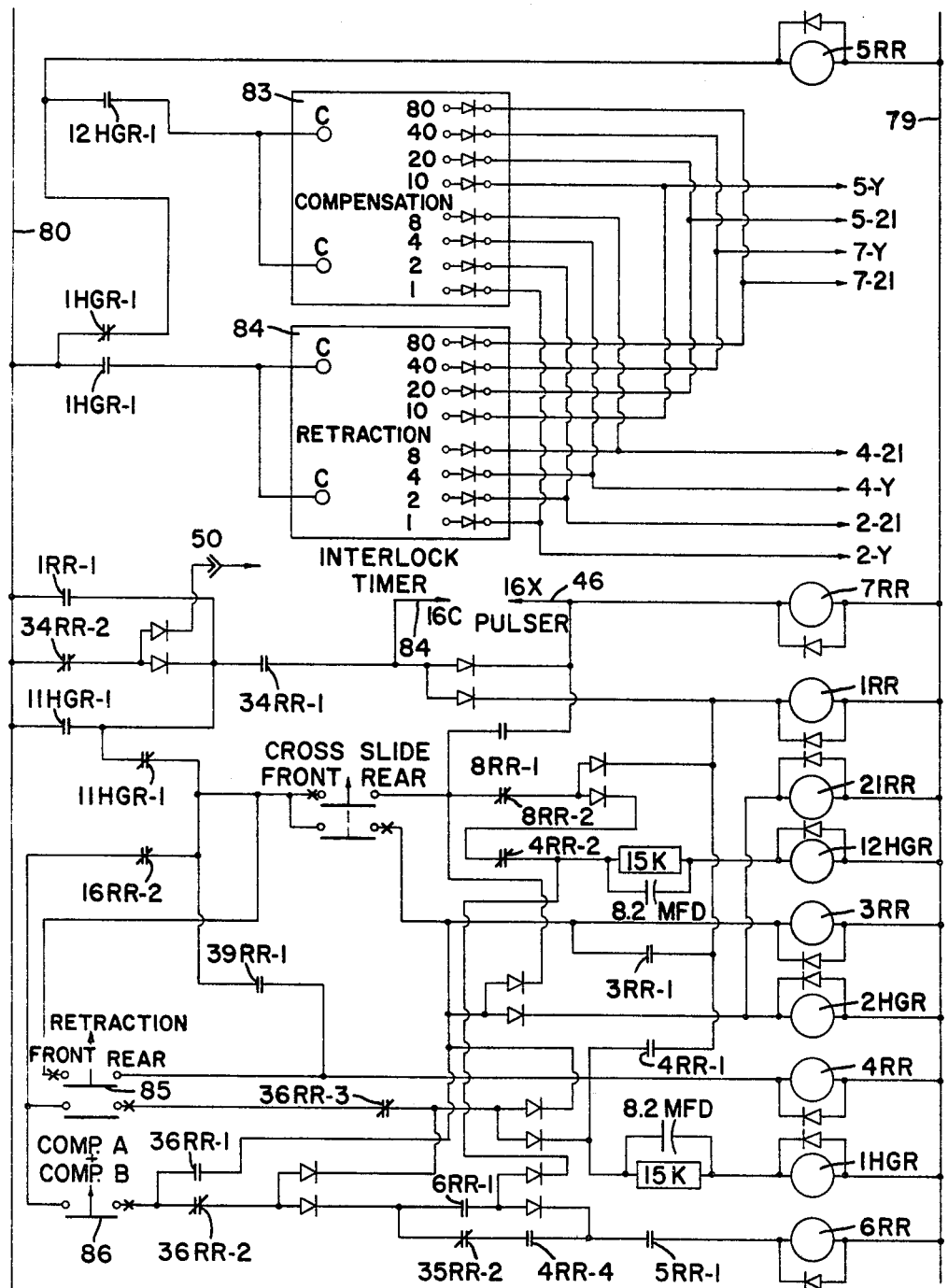

Referring now to FIG. 4, the line 80 is connected through a normally-closed contactor 1HGR–1 and the coil of the relay 5RR to the line 79. The line extending at the common sides of the contactor 1HGR–1 and the coil of the relay 5RR is connected through a normally-open contactor 12HGR–1 to a compensation count selector 83. The line 80 is also connected through a normally-open contactor 1HGR–1 to a retraction count selector 84. FIG. 4 also shows the various connections between the pulser 46 and an interlock timer 84. It shows the various connections between the cross-slide switch, the retraction switch 85, and a COMP. A and COMP. B switch 86.

Figure 5:
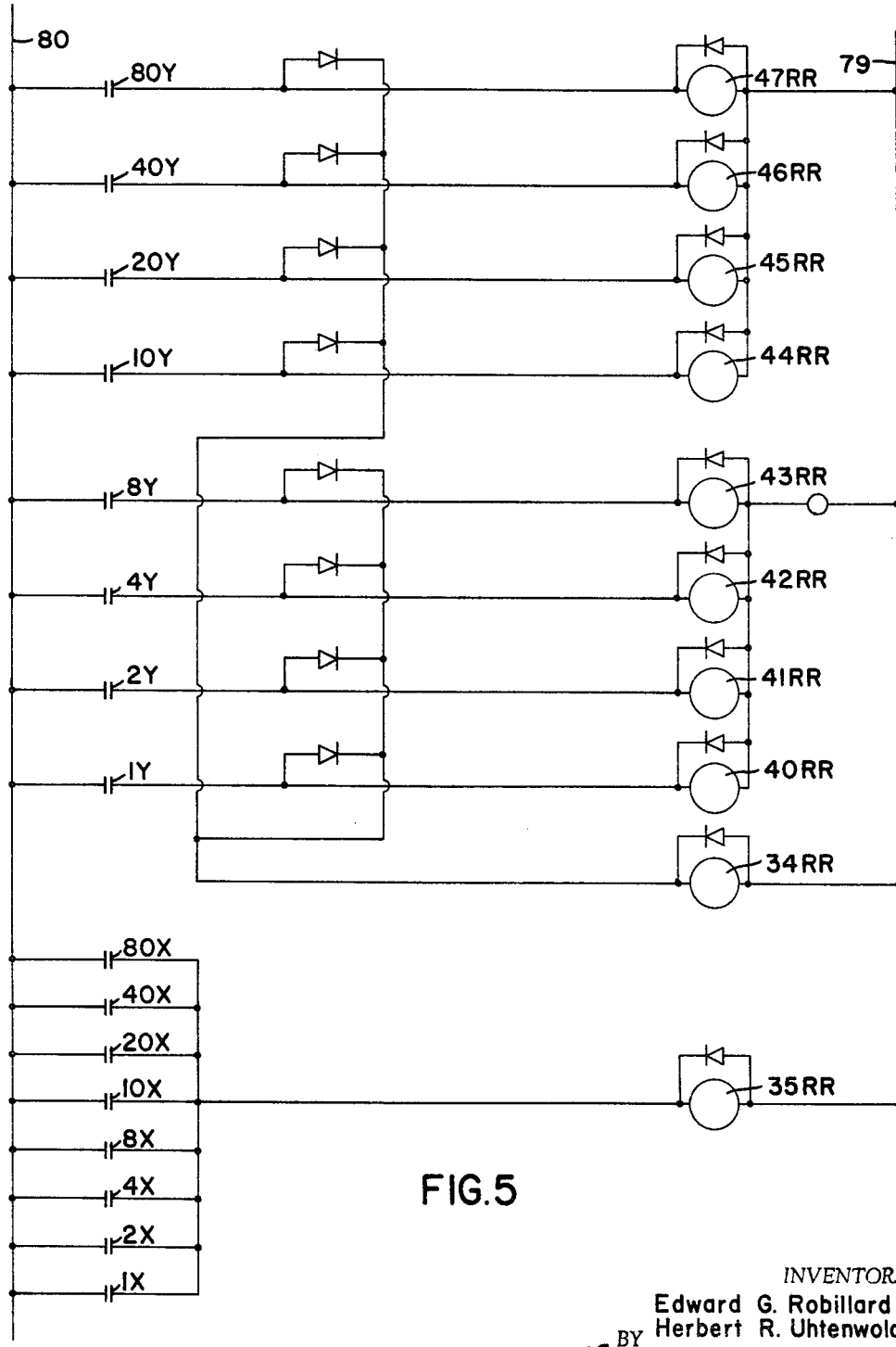

Referring to FIG. 5, it can be seen that from the line 80 to the line 79 are connected a number of elements including a normally-open contactor 80Y in series with the coil of a relay 47RR, a normally-open contactor 40Y in series with the coil of a relay 46RR, a normally-open contactor 20Y and the coil of a relay 45RR, and a normally-open contactor 10Y in series with the coil of a relay 44RR. Similarly connected from the line 80 to the line 79 is a normally-open contactor 8Y in series with the coil of a relay 43RR, a normally-open contactor 4Y in series with the coil of a relay 42RR, a normally-open contactor 2Y in series with the coil of a relay 41RR, and a normally-open contactor 1Y in series with the contactor 40RR. The mid-point between all of these previously-mentioned normally-open contactors and the coils of their relays are connected through rectifiers to the coil of a relay 34RR. Similarly, the one side of a number of normally-open contactors associated with counting operations are connected through the coil of a relay 35RR, as is evident in the drawing.

Figure 6:
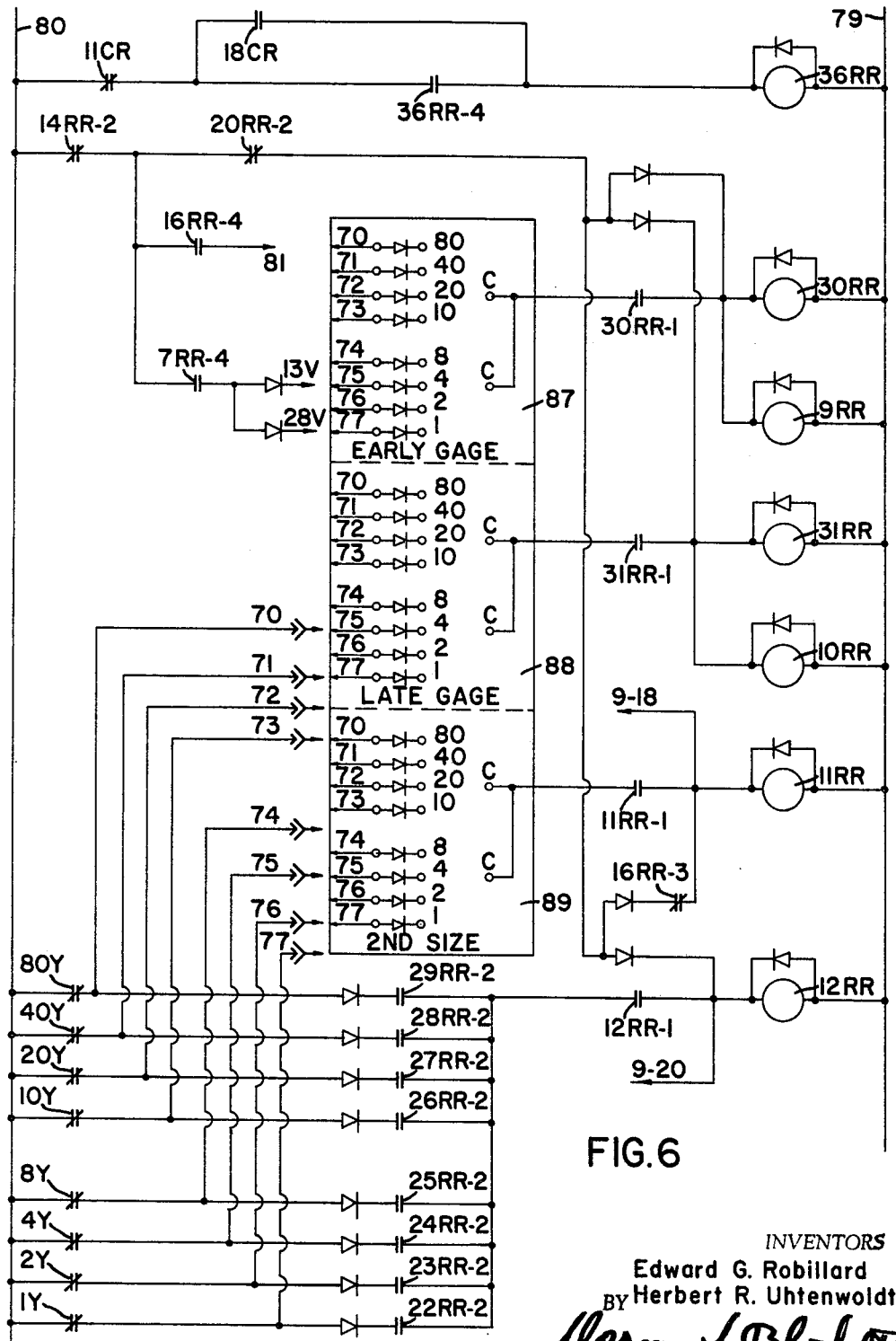

In FIG. 6, the line 80 is connected to the line 79 through a normally-closed contactor 11CR, a normally-open contactor 36RR–4, and the coil of a relay 36RR in series. Around the normally-open contactor 36RR–4 is connected a normally-open contactor 18CR. Also, in this figure, it can be seen that an EARLY GAGE count selector 87, a LATE GAGE count selector 88, and a SECOND SIZE count selector 89 are variously connected to relays and their contactors to operate the coils of relays 30RR, 9RR, 31RR, 10RR, 11RR, and 12RR.

Figure 7:
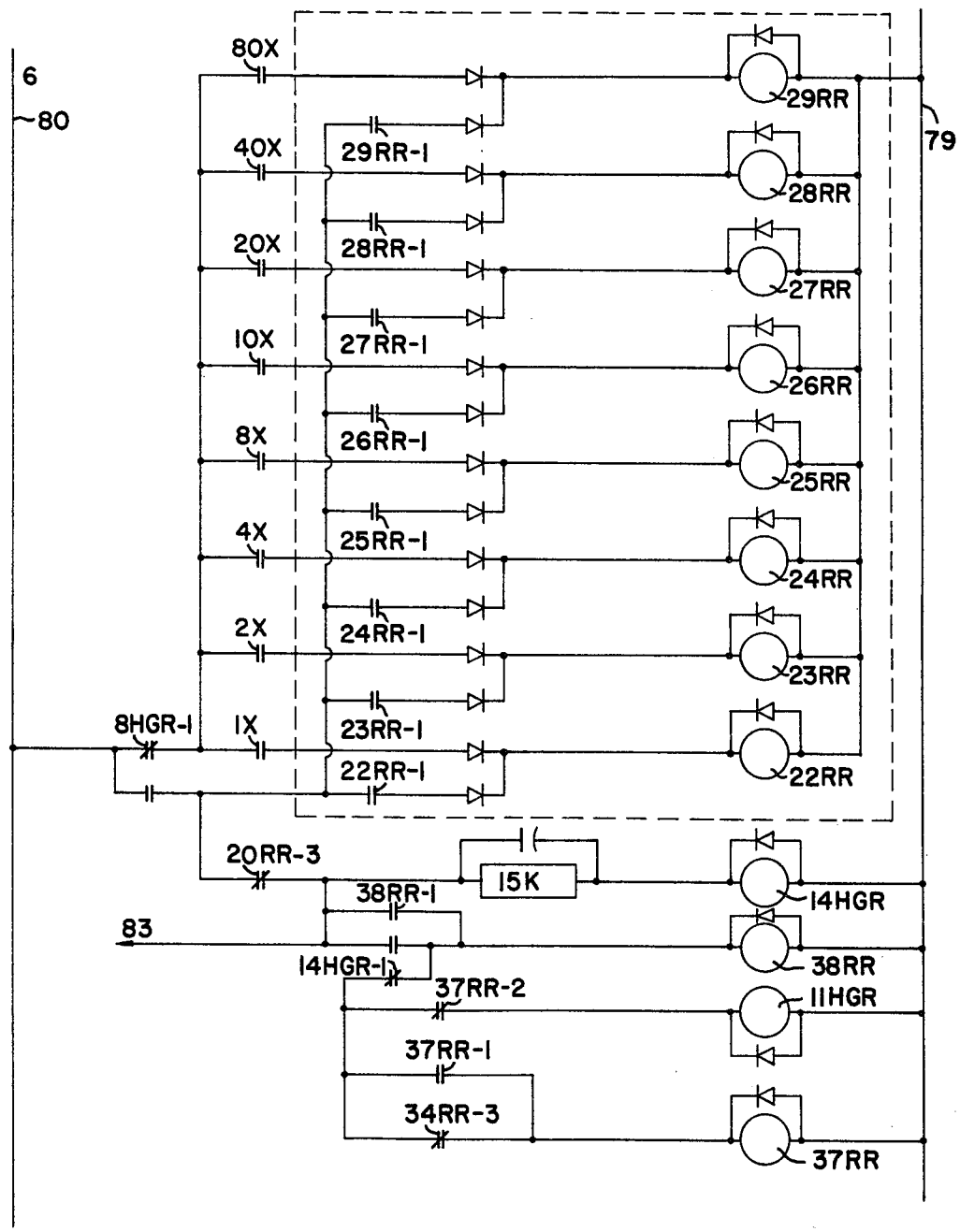

In FIG. 7 are shown the various connections associated with the relays 29RR, 28RR, 27RR, 26RR, 25RR, 24RR, 23RR, 22RR, and 14HGR, 38RR, 11HGR, and 37RR.

Figure 8:
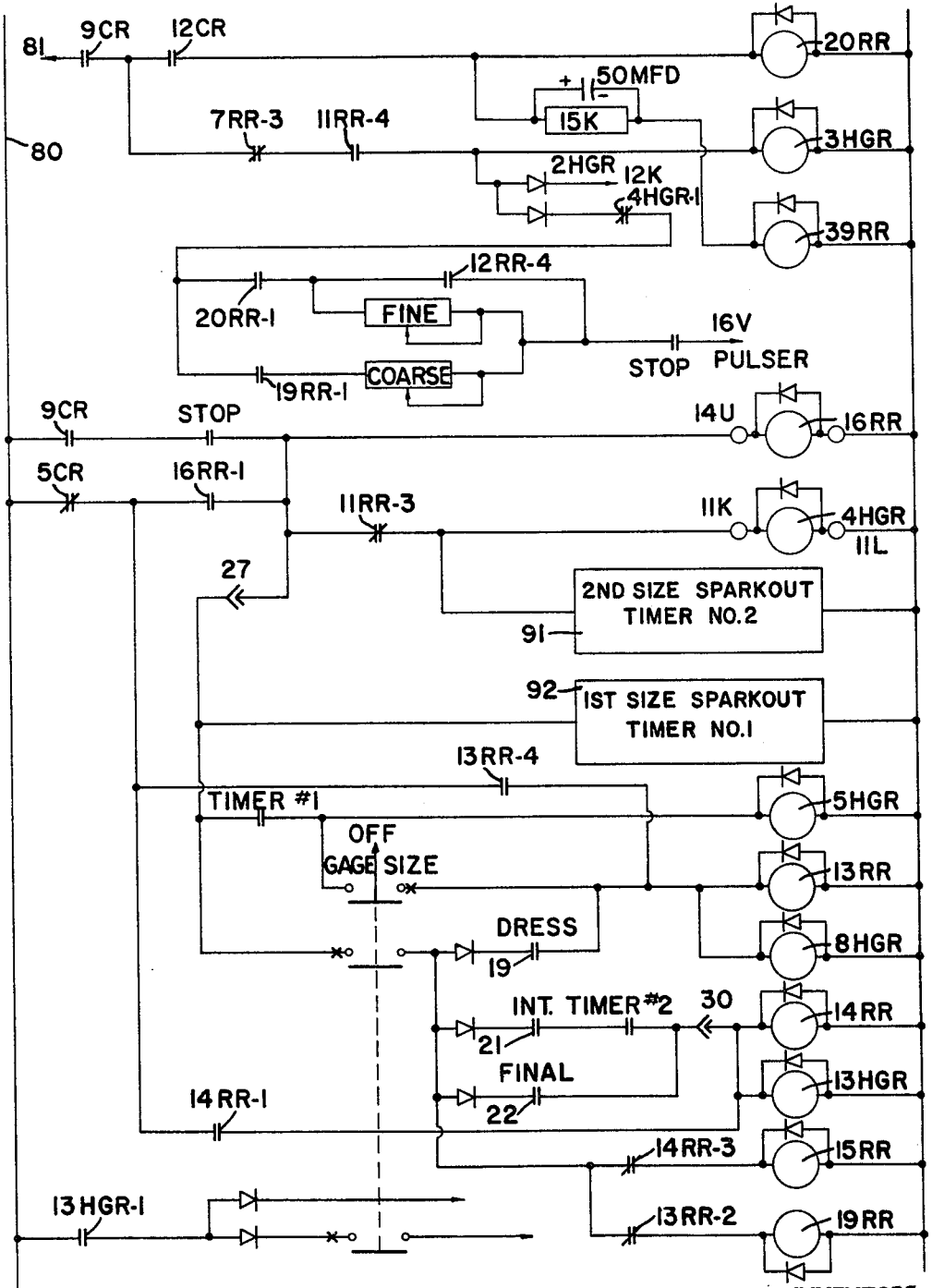

FIG. 8 shows the various elements connected between the lines 80 and 79 having to do with the operation of the relays 20RR, 3HGR, 39RR, 16RR, 4HGR, 5HGR, 13RR, 8RR, 14RR, 13HGR, 15RR, and 19RR. In addition, one should note the presence of the dress switch 19, the INTERMEDIATE SIZE switch 21, and the FINAL SIZE switch 22. Also in the circuitry are a SECOND SIZE SPARKOUT timer 91, as well as a FIRST SIZE SPARKOUT timer 92.

Figure 9:
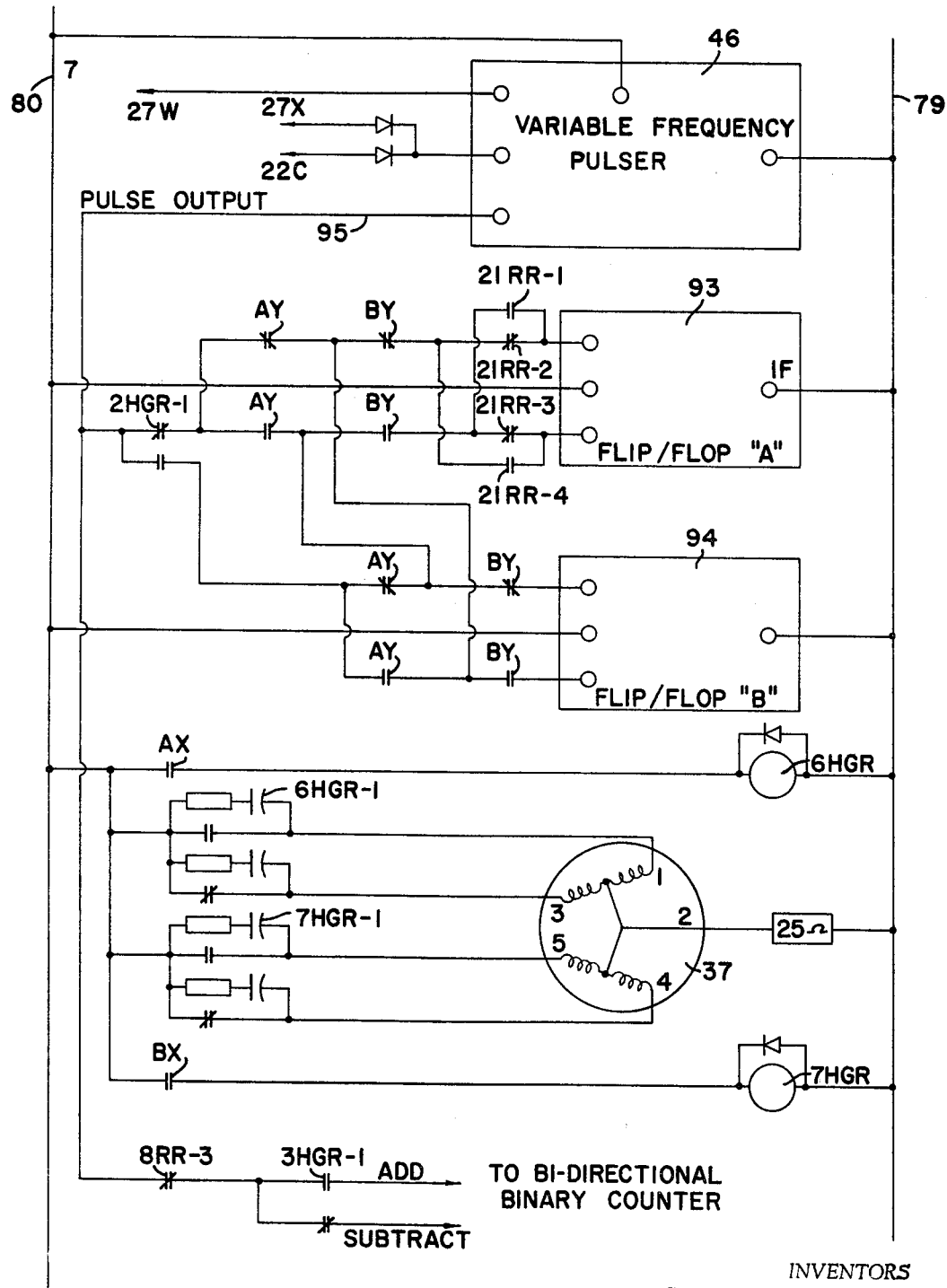

Referring to FIG. 9, it can be seen that various elements are connected between the lines 80 and 79. Noticeable is the variable frequency pulser 46, a flip-flop "A" 93, a flip-flop "B" 94, and the stepping motro 37. As is evident in the drawing, the output of the pulser leads through a line 95 to the input of the flip-flop "A" and the flip-flop "B" as well as to the stepping motor 37 and to lines leading to the binary counter 56.

Figure 10:
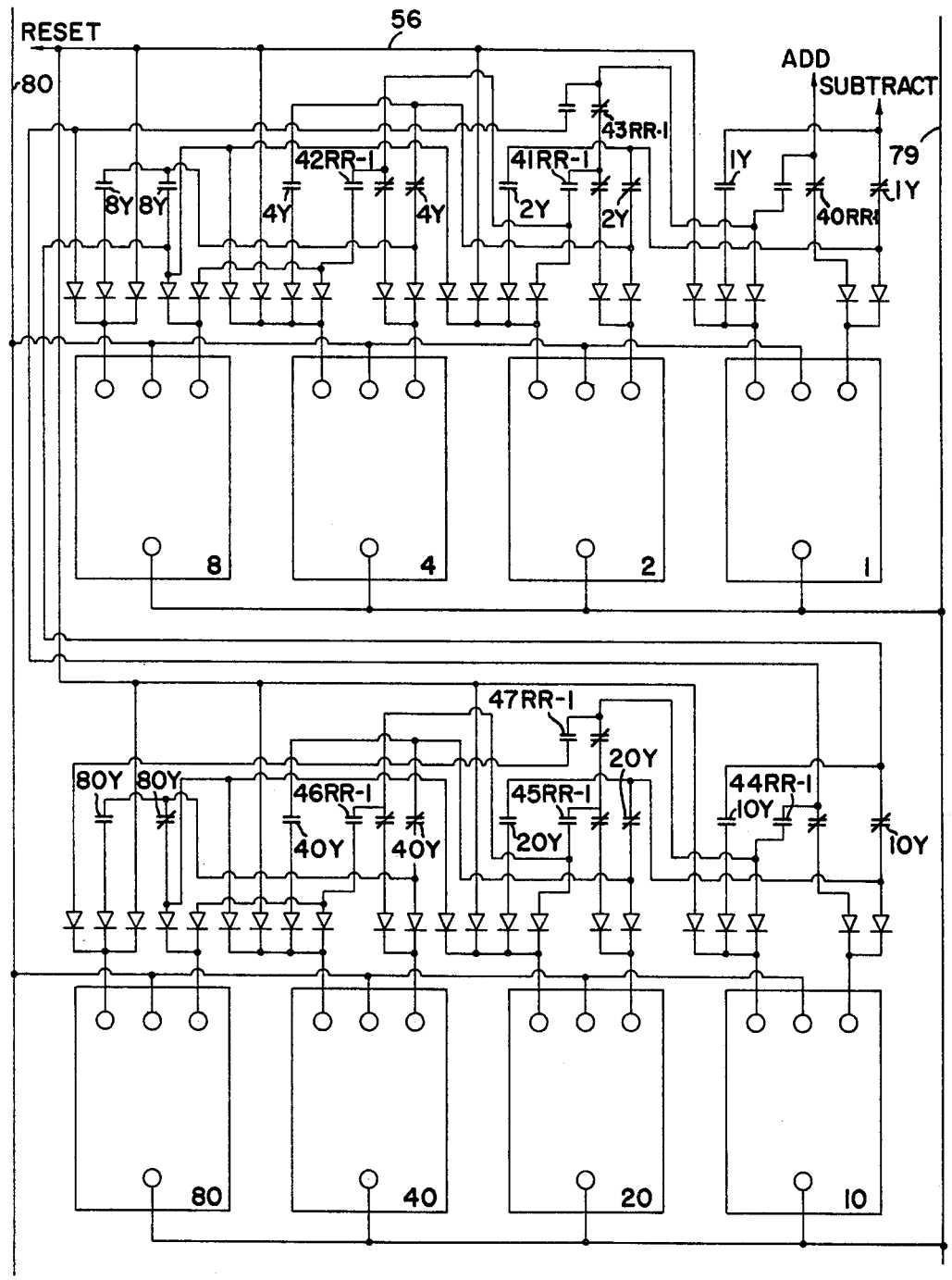

In FIG. 10 can be seen some of the details of the binary counter 56 including the "ADD" and the "SUBTRACT" connections to the elements in FIG. 9.

In FIG. 11 are shown the various electrical connections to provide for feedback for the adjustment from time to time of the finger 27. It includes a flip-flop "S" 96, and a flip-flop "L" 97, as well as the coils of relay 17RR, 18RR, and 32RR.

FIG. 12 shows the control racks and the relative location of the various parts of the apparatus in the control cabinet.

Figure 13:
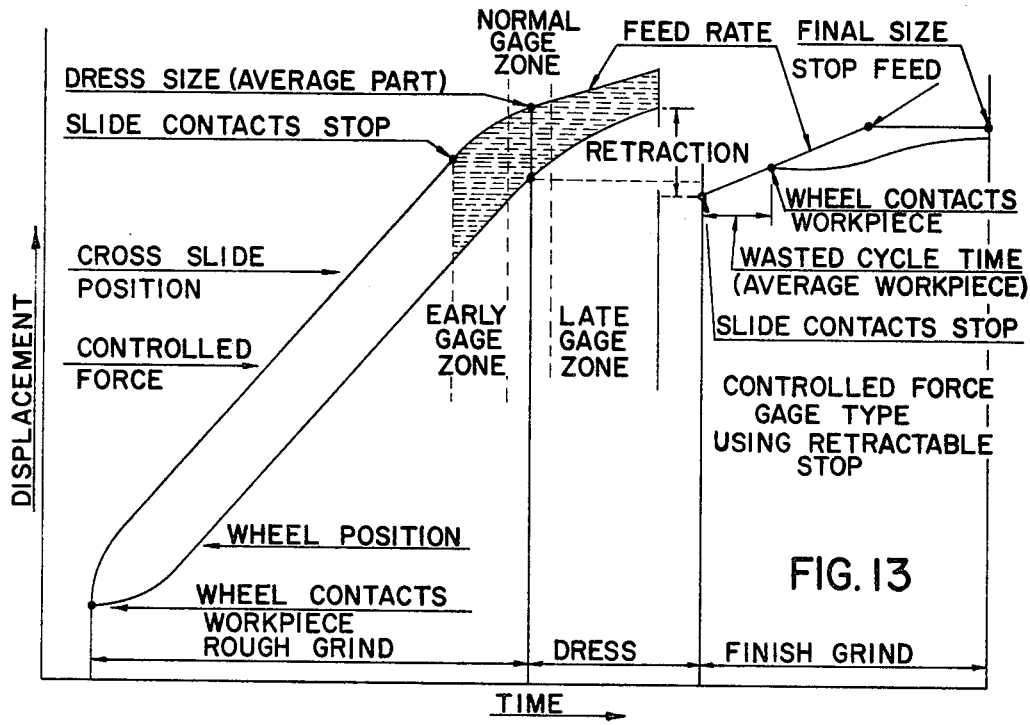
FIG. 13 is a diagram showing the operation of a grinding machine in accordance with the prior art.

FIG. 13 shows the operation of a controlled-force grinding machine of the gage-type using a retractable stop to give feed rate feeding at the end of the rough grind and feed rate feeding for the finish grind.

Figure 14:
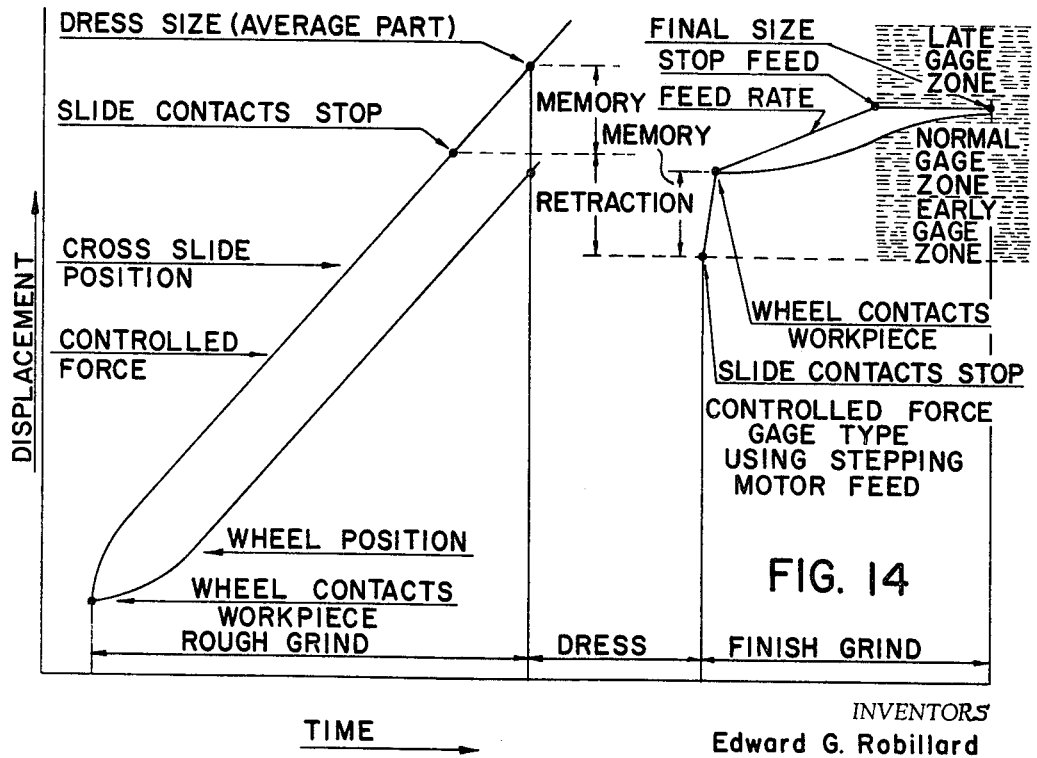
FIG. 14 is a diagram showing the operation of a grinding machine in accordance with the present invention.

In FIG. 14, the diagram shows the operation of the controlled-force grinding machine of the gage-type using a stepping motor to regulate the feed at the end of the rough grind and using it for the finish grind. Both charts show the displacement of both the cross-slide and the grinding wheel. In FIG. 13, both cross-slide and wheel move together until the wheel contacts the workpiece. When this happens, the wheel starts to lag the cross-slide by an amount proportional to the grinding force. Since this is a controlled-force grinder, both lines are parallel until the cross-slide (carrying the wheelhead) contacts the feed stop and the switch 28 associated with it. This electrical signal releases the in-process gage 18 and starts to retract the feed stop in accordance with the prior art practice. The rate at which this stop is retracted is always much slower than the controlled-force grinding rate. This results in some of the force being transferred from the workpiece to the stop and causing it to deflect as it is being retracted. While this is taking place the gage measures the bore and will call for a dress when the bore reaches a given diameter. This signal should occur somewhere in the normal gage zone. After dress, it is necessary to retract the stop so that all deflections are taken up before the wheel contacts the workpiece. Since this deflection is not constant in this zone, the value of retraction must be set for the worst case. This results in wasted cycle time on an average workpiece because of the slow feed that is used after dress. This condition is even worse on a feed rate grinding machine because the deflection is always different at the first size point (where dress takes place).

Referring to FIG. 14, in the present invention, of course, the retractable stop has been replaced with an adjustable stop that will contact the compensation slide in the same manner to release the gage. Instead of retracting the stop, however, the compensation slide 26 is moved to the rear of the machine in .000050" increments. The slide will only move far enough ahead to break electrical contact each time it is contacted by the cross slide. It will be understood that the gage 18 remains operative, despite the fact that the electrical contact is broken.

FIG. 14 shows the way in which the stepping motor is used in a grinding cycle. The cycle is the same as the previous cycle until the slide contacts the stop 27 for the first time. The releases the gage 81 and the compensation slide 26 is retracted to the rear to break electrical contact. This takes little or no force and, for all practical purposes, the grind continues at the controlled-force rate and the deflection remains constant. When the dress size signal is obtained from the gage, the stop will be synchronized with the gage at a known deflection. This means that the retraction does not have to be set for a worst case situation as was necessary in the prior art cycles. A memory circuit is required for this cycle because the compensation slide has to be reset to "0" for dressing the wheel. The memory circuit allows the slide to rapid traverse back to the count that was present when the dress signal occurred. The slow or fine feed is obtained by varying the frequency of the pulser controlling the stepping motor. At this time, the stop is always in contact with the compensation slide and can't feed any faster than the pulser will allow it.

Figure 15:
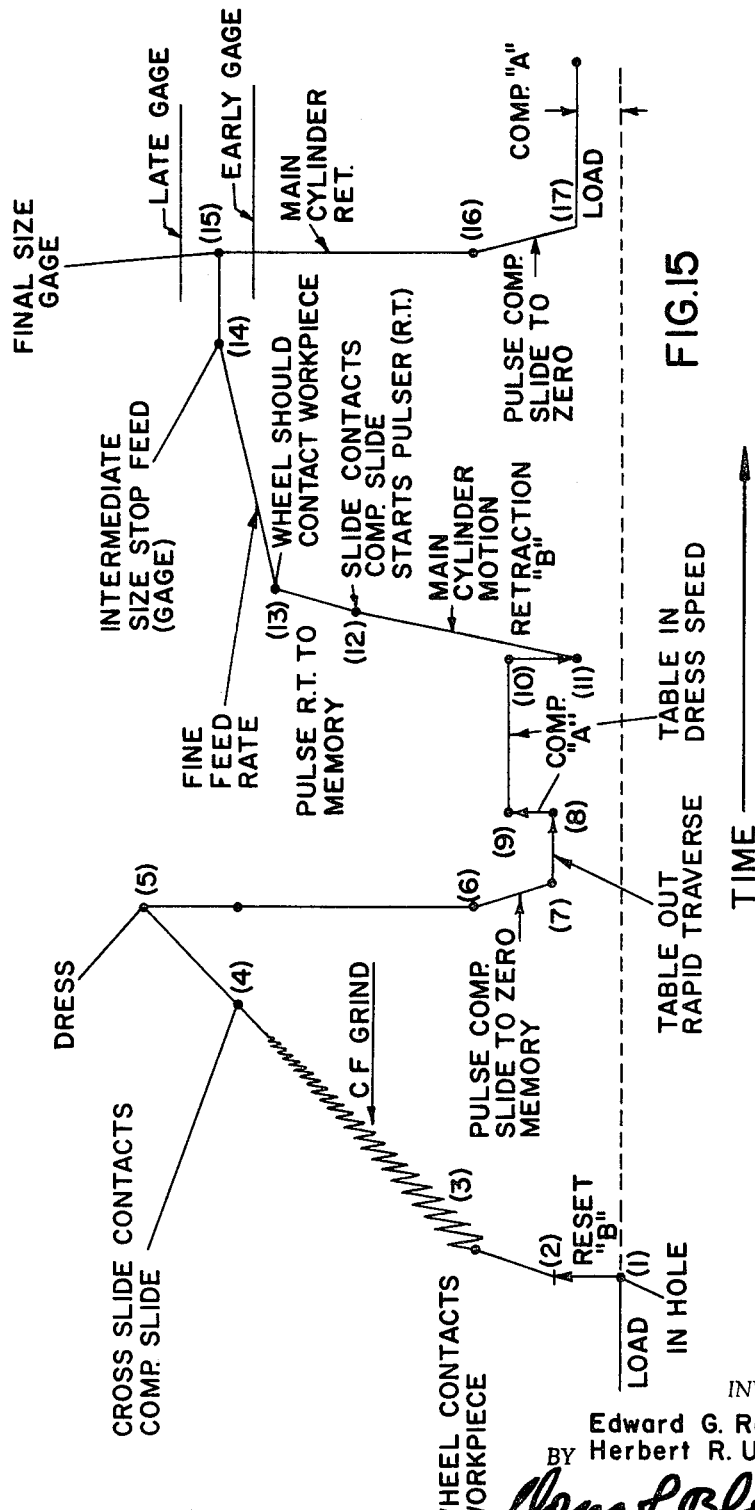
FIG. 15 is a somewhat different diagram showing the operation under the present invention.

In FIG. 15 is a diagram showing the present cycle in more detail. At the point "1" the new workpiece has been loaded into the grinding machine and the cross-slide is at the front of the machine with the finger 29 contacting the stop 31. The workhead table 13 is to the left and the abrasive wheel, therefore, is out of the workpiece. A number of reset pulses are introduced into the stepping motor 37, this being the amount "B." The compensation slide is pulled to the rear of the machine, carrying the cross-slide 25 with it, so that the cross-slide and the wheel occupy the position (2). The cycle is begun, hydraulic oil is introduced into the cylinder 32, and the cross-slide 25 begins to move rearwardly, the finger 29 leaving the stop 31.

The workhead table 13 is moved to the right so that the abrasive wheel 35 lies within the workpiece bore 15. The table cross-slide 25 moves rearwardly very rapidly carrying the wheel with it and at the point (3) the abrasive wheel contacts the surface of the workpiece. In the beginning, the grind has a cyclic or damped vibration appearance because of the rounding-up operation, but this, eventually, smooths out, the grinding taking place in accordance with the controlled-force principle, since the only thing pushing the abrasive wheel against the workpiece is the pressure of the oil in the cylinder 32, which pressure is maintained at a constant rate. Eventually, the cross-slide moves rearwardly until the finger 27 contacts the feed stop 28 at the point (4). This has two effects; first of all, it causes the in-process gage 18 to become operative and to start measuring the diameter of the bore and, secondly, pulses are introduced into the stepping motor 37 to move the compensation slide 26 rearwardly. Controls are set up so that the compensation slide moves away from the stop 27 a short distance. Then the cross-slide 25 catches up with the compensation slide and the finger 27 again makes contact with the feed stop 28. This goes on in very small increments which are not felt by the machine because of the ability of the resilient spindle 34 to absorb any irregularities in the motion. In the preferred embodiment, the compensation slide is fed pulses to keep it ahead of the cross-slide 25 just enough so that the grinding from the point (4) to the point (5) is an extension of the controlled-force line which took place before. Eventually, the gage 18 tells the controls that the "dress" size has been reached. In the meantime (from point 4 to point 5), the pulses which have been presented to the stepping motor 37 have been counted and placed in a memory. At the point (5), the hydraulic fluid is introduced in reverse into the cylinder 32 and the cross-slide 25 moves forwardly carrying the wheel with it from the point (5) to the point (6). Then, the memory number of pulses is reintroduced in reverse to the stepping motor to carry the compensation slide 26 forwardly again. At that point the table 13 moves to the left carrying the workpiece away. The diamond 17 is also carried to the left. Then, a number of pulses are introduced into the stepping motor 37 to carry it from the point (8) to the point (9), this being an amount "A," which is the introduction of compensation movement before dress in a manner well known in the grinding field. Once the wheel has been moved forwardly with the cross-slide 25 to the point (9), the table 13 is moved to the right again, so that the diamond 17 moves over the workpiece and dresses it. The wheel then remains inside of the workpiece within the bore 15. Then, pulses are introduced into the stepping motor 37 for a retraction movement, this retraction being the same number of pulses "B" which is previously placed in the reset of the compensation slide from the point (1) to the point (2). The retraction "B" carries the compensation slide to the point (11). The cross-slide is carried forward with the compensation slide so that it and the wheel are also at the point (11). The main cylinder 32 is energized to carry the cross-slide rearwardly again until the finger 27 strikes the feed stop 28 on the compensation slide at the point 12. Then, the "memory" number of pulses is introduced into the stepping motor 37 again, but in a direction to cause the compensation slide to move rearwardly carrying the cross-slide 25 with it to the point (13). It will be understood that pressure oil remains in the cylinder 32 so that the cross-slide is attempting to move rearwardly all the time. This means that, when pulses are introduced into the stepping motor 37 at the slow rate to cause the compensation slide to move rearwardly, the cross-slide will move rearwardly with it along the line from the point (13) to the point (14). The point (14) is reached when the gage 18 indicates that the intermediate point has been reached and the switch 21 is energized by the pressure air in the pneumatic gage. This causes the termination of feed altogether; not only is the oil locked in the cylinder 32 but no further pulses are presented to the stepping motor 37. Grinding continues to take place by sparkout (that is to say, by the relief of deflection in the spindle 34) until the gage 18 indicates that the final size has been reached at the point (15). Oil is reversed in the main cylinder 32 so that the cross-slide 25 moves forwardly to the point (16) and then further reverse pulses are introduced into the stepping motor 37 to return the slide to zero at the point (17). It will be noted that the position (17) is further to the rear of the machine by an amount equal to the compensation (A), as is usual in cases of making use of compensation in connection with the dressing operation.

The present invention offers several advantages over the prior art. First of all, the ability to synchronize the feed stop with the gage-controlled dress signal with little or no force on the stop saves considerable cycle time. This is especially true if there are large O.D. and stock variations in the workpieces.

The feedback to the size control will be much more accurate because it is related to distance and not to time (as used in prior art machines). This feedback is also much easier to set than the present mehod. It also has the advantage that a similar circuit can be used for all machines, whether a triple-point pneumatic gage is used, as described in the preferred embodiment, or a single point gage such as a plug gage is used. A "consecutive count" counter need not be used to prevent the feedback circuit from hunting, because of the greater accuracy of the system.

There are a number of practical advantages to the invention, including reliability. It is possible to use in the system reed-type modules which have a life expectancy of at least $200 \times 10^6$ operations. A typical grinding machine using this system operating 20 hours a day for 300 days a year with a 20-second cycle time will accumulate $100 \times 10^6$ operations on one of the modules and approximately $50 \times 10^6$ operations on another. It would be recommended that these modules be interchanged with other modules within the unit every year under such a duty cycle. All of the circuit boards should far exceed the life expectancy of the machine.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine for the finishing of a surface of revolution of a workpiece, comprising
   (a) a base,
   (b) a workhead mounted on the base to support the workpiece,
   (c) a wheelhead mounted on the base and carrying a rotatable spindle with an abrasive wheel,
   (d) a dressing apparatus,
   (e) control means bringing about relative movement between the wheelhead and workhead longitudinally and transversely of the axis of the said surface of revolution to produce a grinding cycle between the wheel and the workpiece, the cycle consisting of a rough grind, a dress, and a finish grind,
   (f) a gage connected to the control means to terminate the rough grind and begin a dress when the surface reaches a predetermined size,
   (g) feed means forming part of the control means for pressing the wheel against the workpiece with a controlled force during the initial major portion of the rough grind, (h) a stop which the wheelhead contacts at an intermediate point in the rough grind to terminate the controlled force portion and to present the wheel to the workpiece at a controlled rate, and (i) means including a stepping motor to produce the feed at the controlled rate.

2. A grinding machine as recited in claim 1, wherein a generator is provided to transmit electrical pulses to the stepping motor, wherein a memory counts the number of pulses transmitted from the point when the wheelhead contacts the stop to the time when the gage indicates that the dress size has been reached, and wherein the said number of pulses is reintroduced in reverse to the stepping motor to return to the said point.

3. A grinding machine as recited in claim 2, wherein the said number of pulses is compared with a standard number and, if it differs substantially from the said number, the gage is adjusted so that subsequent workpieces will be subjected to a grinding cycle in which the number of pulses will not differ substantially from the said standard number.

4. A grinding machine for finishing a surface of revolution on a workpiece by means of an abrasive wheel, comprising (a) means for bringing the wheel into engagement with the workpiece to produce a rough grind with controlled force, for removing the wheel from the workpiece and dressing the wheel, and for bringing the wheel into engagement with the workpiece to produce a finish grind with feed rate, (b) means measuring the distance from a predetermined point to the point of termination of the rough grind, backing the wheel that same distance during the dressing operation, and returning the wheeel that same distance after dressing, so that the finish grind can start without loss of time and without striking the workpiece prematurely.

5. A grinding machine as recited in claim 4, wherein the abrasive wheel is mounted on a spindle which, in turn, is mounted in a wheelhead supported on a wheelhead table which is slidable on a base transversely of the axis of the surface of revolution, wherein a compensation slide is also slidable transversely independently of the said wheelhead table, wherein the compensation slide is movable by a screw operated by a stepping motor, and wherein the wheelhead table has a first stop which engages the compensation slide on occasion at a first point in relative movement between them.

6. A grinding machine as recited in claim 5, wherein the wheelhead table has a second stop which engages the compensation slide at a second point in the relative movement between them.

7. A grinding machine as recited in claim 6, wherein a control introduces a preselected number of pulses to the stepping motor as a compensation before dressing, introduces and memorizes a number of pulses to move the compensation slide the said distance from the predetermined point to the point of termination of the rough grind, reintroduces the same number of pulses in reverse mode to the stepping motor before dress, and reintroduces the same number of pulses in direct mode to the stepping motor after the dress.

8. A grinding machine as recited in claim 7, wherein the control also introduces a number of pulses in direct mode to the stepping motor for a reset movement of the compensation slide before the rough grind and reintroduces the same number of pulses in reverse mode for a retract movement after dress.

9. A grinding machine as recited in claim 8, wherein a hydraulic cylinder is provided to produce rapid movement of the wheelhead table relative to the compensation slide from the first point to the second point and vice versa, the cylinder being operative at the termination of the rough grind to produce the movement in one direction before dress and being operative before the finish grind to produce the movement in the other direction after dress.

References Cited

UNITED STATES PATENTS

| | | | |
|---|---|---|---|
| 2,771,714 | 11/1956 | Schmidt et al. | 51—165 X |
| 2,932,130 | 4/1960 | Blood et al. | 51—165 X |
| 3,197,921 | 8/1965 | Hohler et al. | 51—48 X |
| 3,382,623 | 5/1968 | Hohler | 51—165 |
| 3,403,480 | 10/1968 | Robillard | 51—165 |

LESTER M. SWINGLE, Primary Examiner